United States Patent [19]
Wickman

[11] Patent Number: 5,910,943
[45] Date of Patent: Jun. 8, 1999

[54] METHOD AND DEVICE IN RADIO BASED TELECOMMUNICATION SYSTEM USING REPEATERS

[75] Inventor: Johan Wickman, Bjarred, Sweden

[73] Assignee: Telia AB, Farsta, Sweden

[21] Appl. No.: 08/776,599

[22] PCT Filed: Jul. 12, 1995

[86] PCT No.: PCT/SE95/00849

§ 371 Date: Apr. 1, 1997

§ 102(e) Date: Apr. 1, 1997

[87] PCT Pub. No.: WO96/07250

PCT Pub. Date: Mar. 7, 1996

[30] Foreign Application Priority Data

Aug. 19, 1994 [SE] Sweden .................................. 9402769

[51] Int. Cl.⁶ ...................................................... H04B 7/14
[52] U.S. Cl. ............................................................... 370/279
[58] Field of Search .................................... 370/315, 321,
370/322, 323, 326, 316, 328, 329, 331,
337, 345, 347, 276, 280, 294, 442, 498,
501, 502, 277, 279, 281, 293; 455/11.1,
12.1, 13.1, 13.2, 16, 18, 74.1, 462

[56] References Cited

U.S. PATENT DOCUMENTS 5,133,080  7/1992  Borras .

FOREIGN PATENT DOCUMENTS

| A 0 637 144 | 5/1990 | European Pat. Off. . |
| A 0 497 490 | 8/1992 | European Pat. Off. . |
| WO 94/14250 | 6/1994 | WIPO . |
| WO 94/17605 | 8/1994 | WIPO . |

*Primary Examiner*—Huy D. Vu
*Attorney, Agent, or Firm*—Oblon, Spivak, McClelland, Maier & Neustadt, P.C.

[57] ABSTRACT

A radio based communication system including stationary units, portable or mobile units, and repeaters. Respective mobile units communicate using a normal access schedule where transmitting and receiving functions are separated in time, for instance with a half time frame. Reception for a respective current stationary unit is delayed a number of time slots in relation to transmitting from the stationary unit, at which the stationary unit is aware of the delay and consequently the use of a repeater. Also repeating of information is arranged to be performed within one time frame.

12 Claims, 4 Drawing Sheets

Access demand from PP to REP on slot (channel) n. REP selects slots for communication with RFP. For uplink (REP->RFP) the best slot of n+1 to N is selected. For downlink (RFP->REP) the best slot of 0 to n-1-N/2 is selected. At performed channel selection REP repeats to RFP. In control field RFP is informed of desired channel for downlink rep.

RFP transmits on approved channel to REP, which after that repeats to PP on the channel indicated by PP at above mentioned access demand. After that the now established duplex communication proceeds.

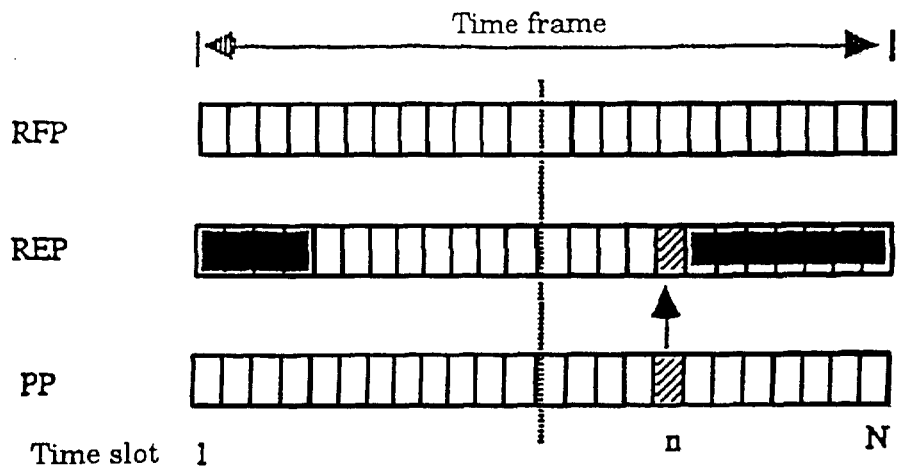

Access demand from PP to REP on slot (channel) n. REP selects slots for communication with RFP. For uplink (REP->RFP) the best slot of n+1 to N is selected. For downlink (RFP->REP) the best slot of 0 to n-1-N/2 is selected. At performed channel selection REP repeats to RFP. In control field RFP is informed of desired channel for downlink rep.

*FIG. 2A*

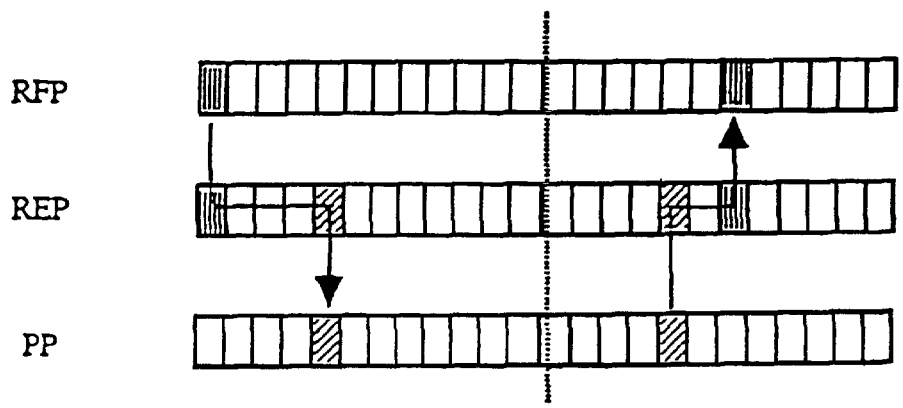

RFP transmits on approved channel to REP, which after that repeats to PP on the channel indicated by PP at above mentioned access demand. After that the now established duplex communication proceeds.

*FIG. 2B*

METHOD AND DEVICE IN RADIO BASED TELECOMMUNICATION SYSTEM USING REPEATERS

BACKGROUND OF THE INVENTION

1. Field of the Invention

The present invention relates to a method in a radio based telecommunication system, preferably the Digital European Cordless Telephone (DECT) system, in which a duplex channel is established utilizing repeaters which are performing the repeating without causing serious delays and/or interference.

2. Discussion of the Background

Repeaters in radio based communication systems can for many applications be of very great importance for the economy and functionality of the system. One example of a powerful repeater application is the radio based local network application OMA (Omradesbegransad Mobil Access= Area Restricted Mobile Access). The application implies that the terminating wire connection to the subscriber is replaced or completed by a surface covering radio. The subscriber is offered terminal mobility within one or more restricted areas. If repeaters are used the numbers of base units can be reduced by a factor of 10–100, resulting in the costs, for among other things the wire connection of base units, to be dramatically reduced. Consequently, repeaters will be very important in future systems.

The importance of repeaters has led to DECT-repeaters (Digital European Cordless Telephone) being presently standardized within ETSI (European Telecommunication Standards Institute) RES-3.

SUMMARY OF THE INVENTION

Compared with previous proposals within the field there is a need for refining and a need for further development to meet the demands which have lately arisen in connection with an ever increasing concentration on repeaters.

The present invention is based on the knowledge that, for avoiding serious delays, repeating must be performed within one time frame. The present invention solves certain technical problems which occur when repeating is performed within one time frame, such as:

How hand over within or between cells is made possible.

How interference between repeaters is avoided in spite of all repeaters having access to all channels.

How the use of capacity demanding double duplex communication between repeaters and a base station is avoided without the need of separating repeating of the control signaling and useful data in different time frames.

How optimal selection of channels can be performed in spite of the portable not "hearing the base station".

How one, regarding portables, avoids influencing present DECT-specification.

THE SOLUTION

See the subsequent patent claims.

ADVANTAGES

The present invention achieves system technical advantages by a repeater function. Hand over will be possible between cells and repeaters. The system can be used in a radio system which uses TDMA/TDD/MC. Appropriate fields of application are radio based local networks, systems for wireless Private Automatic Branch Exchanges (PABX), and public access. In connection with the above mentioned applications, the CT-system DCT900 and DECT may be used in the short run. Notice that it may be quite possible to use one and the same DCT900 or DECT-portable (PP) in all of the above-mentioned applications.

Repeating is made within one time frame. One-way average delay which is added is therefore <2.5 ms. One does not need to use two duplex connections between a Radio Fixed Part (RFP) and a Repeater (REP) which results in less capacity demanding systems. In addition, Cyclical Redundancy Check (CRC) based macro diversity is possible. Macro diversity also becomes possible. The present invention implies that separation of repeating of control signaling and useful data is not needed, which simplifies encryption. Repeaters have a large economic and functional potential for the above-mentioned systems and for future systems using TDMA. The present invention also solves important problems with repeaters being used in a TDMA-system.

BRIEF DESCRIPTION OF THE DRAWINGS

The invention will be described below while, at the same time, is referred to by the enclosed drawings where:

FIG. 2 shows a method for establishing duplex channels.

DESCRIPTION OF THE PREFERRED EMBODIMENTS

The following abbreviations are used:

REP Repeater

PP Portable Part

RFP Radio Fixed Part (corresponding to base station)

ARK Access Rights Key

ARI Access Rights Identity

The following invention gives directives on how repeating with coding/decoding of control fields can be performed in radio systems with time shared access, as for instance in DECT. The PP follows a normal access schedule, for DECT this implies that transmitting and receiving are separated a half time frame. Reception for the RFP is, on the contrary, delayed a number of time slots in relation to transmitting for the RFP.

The RFP, however, must have knowledge of this delay, i.e. that a REP is being used.

Example

A. Set up initiated by the RFP

Set up from the RFP is performed by a normal paging message. Selection of a channel is performed by the PP, whereupon demand for access is returned by the PP on the selected channel. The REP compares the selection of the channel with a REP channel list. If the channel is not sufficiently silent, there will (see also FIGS. 2 and 3) either be no repetition; instead the PP is informed from the REP that the selection of channel is not accepted. The message is sent in downlink on the channel desired by the PP. Or the REP selects another, more silent channel for the RFP-communication, such one that repetition in downlink from the REP yet can be performed on a channel desired by the PP. When accepted, confirmed channel selection repeating is made in uplink. The REP adds a message to a control field regarding a present delay, i.e. the channel for RFP>REP-communication. N.B; if such a message is lacking, the RFP shall suppose that the delay is zero slots. i.e. communication is performed without the REP, direct with the PP.

B. Set up initiated by the PP

Set up from the PP is performed by access demand on the desired channel.

How to avoid two REPs repeating the same message during uplink?

The PP indicates the desired RFP-identity (corresponding to the FMID, which is geographically unique). But this RFP-id also includes a local REP-unique addition. This addition has been added in downlink by the respective REP.

Figure 1:
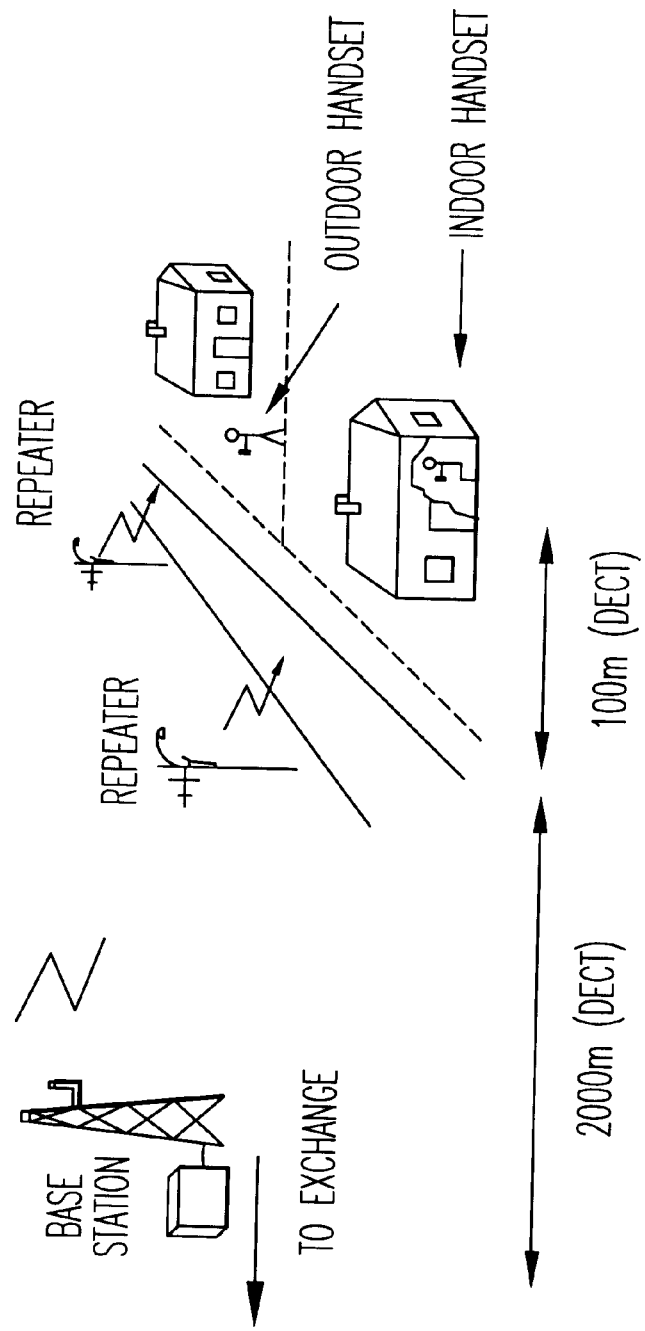
FIG. 1 shows an example of the radio based network application OMA using repeaters.
Figure 3:
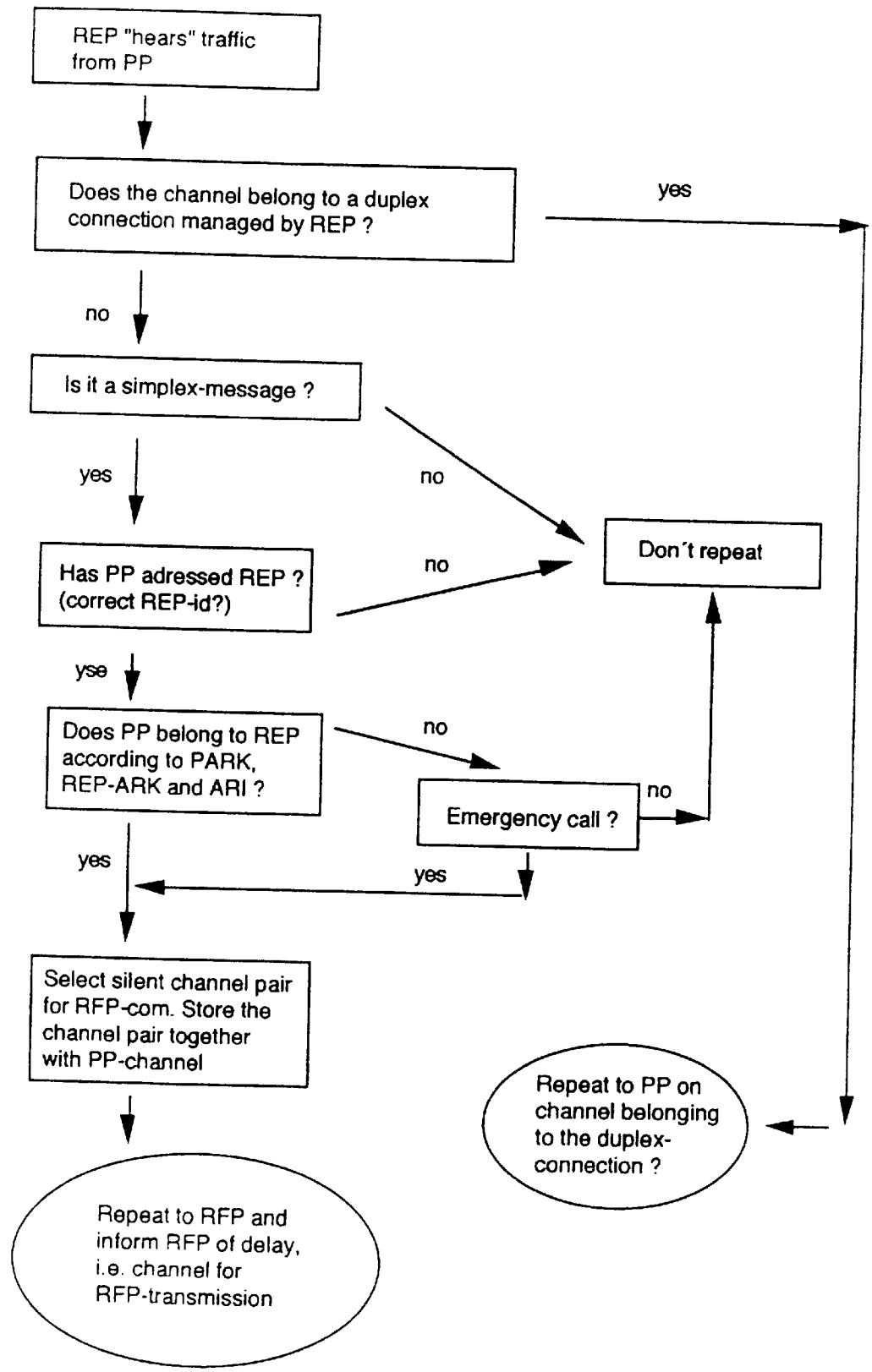
FIG. 3 shows a flow chart for repeating in uplink.

Possibly the REP can remove the ID-addition in uplink in order not to distract the RFP (see FIG. 3).

How to avoid two REP downlink repeating the same message on the same channel?

Figure 4:
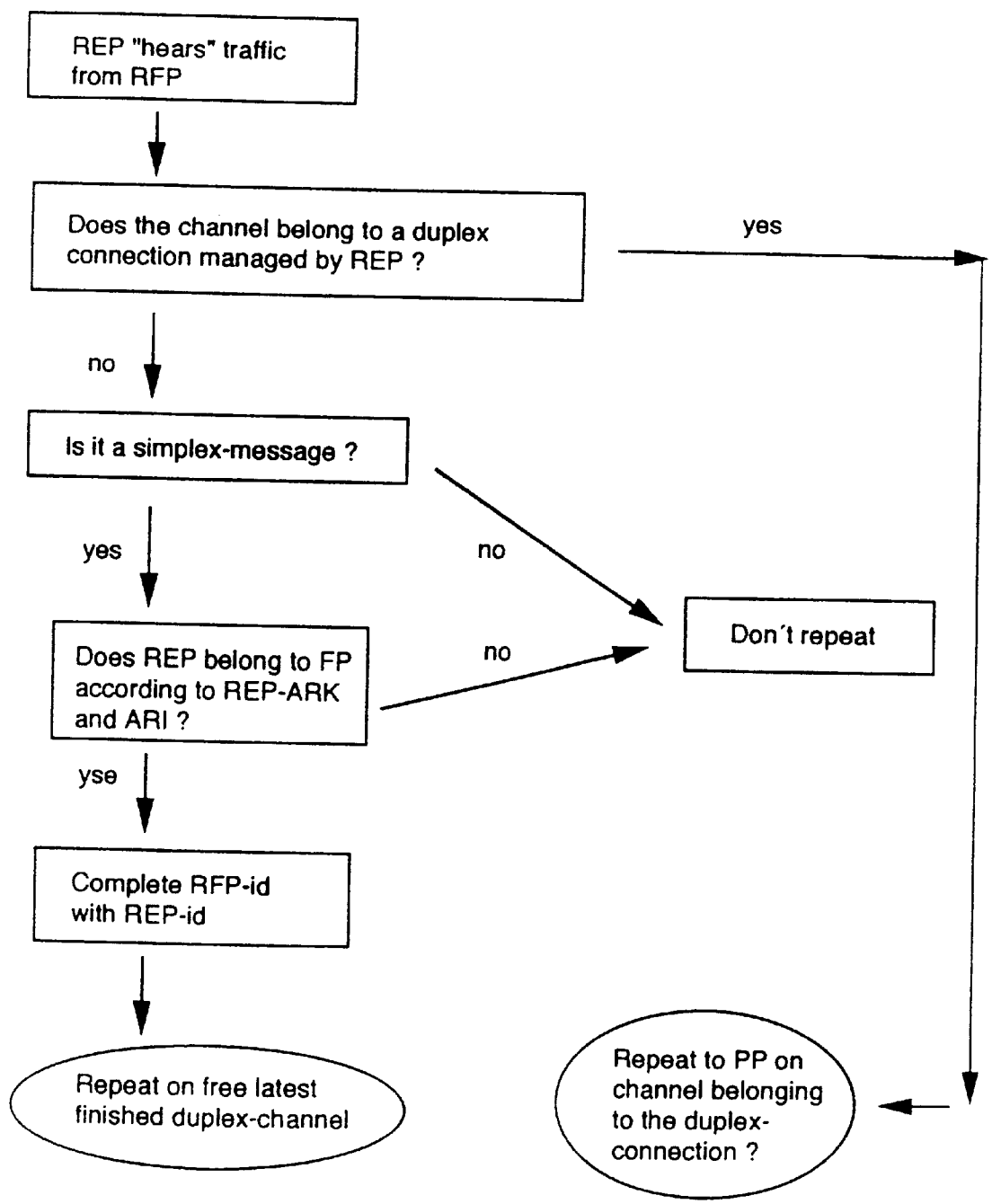
FIG. 4 shows a flow chart for repeating in downlink.

The problem does not exist for established duplex communication because the REP knows which duplex channels it is managing. For simplex messages from one and the same RFP, the adjacent RFP should, on the contrary, repeat on different channels to avoid interference. The selection of a channel can be made in such a way that the REP which receives simplex traffic shall repeat on the free latest finished duplex channel by the REP. (Channel change can also be performed by the REP if the PP demands "change dummy bearer position") (see FIG. 4).

How to manage hand over between two REPs (inter REP handover)?

As previously mentioned each REP indicates its local unique identity as an addition to the RFP-identity. This entails that also inter REP handover is managed—the PP indicates, as we know, indirectly a desired REP-id at each new access demand.

How to manage hand over between the REP and the RFP?

In the same way as inter REP hand over. The PP "sees" that the REP and the RFP have different identities. This implies that the REP will not repeat the new access demand from the PP, because the REP is not addressed. The RFP occurs a "normal" intra cell hand over, but in addition with a change of delay between transmission/reception.

Two adjacent REPs can by using a common identity be used for macro diversity as discussed previously. The REP ought to have an access key (REP-ARK) corresponding to the Park for the PP.

By the REP comparing the REP-ARK with the ARI from the RFP, the REP can decide whether it has the right to repeat from the RFP in question.

The REP-id can also be used by the RFP for addressing a specific REP for system updating, trouble shooting, etc. It may for instance be valuable to have an opportunity to change the REP-ARK for a REP. In this way, for instance, an operator's belonging can be changed.

An emergency call shall be repeated independent of the REP-ARK.

As a further description to FIG. 2, consider an access demand from the PP to the REP on slot (channel) n. The REP selects slots for communication with the RFP. For uplink (REP→RFP) the best slot of n+1 to N is selected. For downlink (RFP→REP) the best slot of 1 to n−1−N/2 is selected. At performed channel selection, the REP repeats to the RFP. In a control field the RFP is informed of a desired channel for the downlink rep.

The RFP transmits on an approved channel to the REP, which after that repeats to the PP on the channel indicated by the PP at the above-mentioned access demand. After that the now established duplex communication proceeds.

I claim:

1. A method in a radio based telecommunication system, using at least one stationary unit, at least one portable unit and at least one repeater in a communication between said units, wherein at an establishing of a duplex channel between said portable unit and said stationary unit an access demand is sent from said portable unit to said repeater on a time slot n, wherein said repeater selects a best time slot among time slots n+1 to N for an uplink communication with said stationary unit, where N represents a number of time slots n in a frame transmitted in said communication between said units, and wherein uplink communication between said portable unit and said stationary unit is established and said repeater repeats transmission information to the stationary unit, and that in a downlink communication, a best time slot among time slots 1 to n−1−N/2 is selected for communication between the stationary unit and the portable unit, wherein said stationary unit transmits on said best slot to said repeater, which repeats transmission information from said stationary unit to the portable unit on said time slot indicated by the portable unit at said access demand, wherein $n+1 \leq N$, and $n \geq 1+N/2$.

2. The method according to claim 1, wherein at an establishing of a simplex channel a selection is made in such a way that the repeater which receives simplex traffic repeats the traffic on that free channel which said repeater latest carried a finished duplex.

3. The method according to claim 1, wherein said repeater indicates its local unique identity as an addition to an identity of the stationary unit, which entails that inter repeater handover is managed by means of the portable unit indirectly indicating a desired repeater identity at each new access demand.

4. The method according to claim 1, wherein handover between said repeater and said stationary unit is made possible in that said portable unit knows that the repeater and the stationary unit have different identities, which implies that said repeater does not repeat the new access demand from said portable unit because said repeater is not addressed.

5. The method according to claim 2, wherein the repeater indicates its local unique identity as an addition to an identity of the stationary unit, which entails that inter repeater handover is managed by means of the portable unit indirectly indicating a desired repeater identity at each new access demand.

6. The method according to claim 2, wherein handover between said repeater and said stationary unit is made possible in that said portable unit knows that the repeater and the stationary unit have different identities, which implies that said repeater does not repeat the new access demand from said portable unit because said repeater is not addressed.

7. The method according to claim 1, wherein said uplink and downlink information is formatted to be used in a Digital European Cordless Telephone system.

8. A method of communication in a radio based telecommunication system including at least one stationary unit, at least one portable unit, and at least one repeater, comprising the steps of:

transmitting from said at least one portable unit access demand information to said at least one repeater on a time slot n;

selecting by said at least one repeater a best time slot among time slots n+1 to N for uplink communication between said at least one portable unit and said at least one stationary unit, where N represents a number of time slots n in a frame transmitted in communication between said at least one stationary unit, said at least one portable unit, and said at least one repeater;

selecting by said at least one repeater a best downlink time slot among time slots 1 to n−1−N/2 for downlink communication between said at least one stationary unit and said at least one portable unit;

repeating by said at least one repeater the access demand information transmitted from said at least one portable unit to said at least one stationary unit, thereby establishing said uplink communication;

transmitting by said at least one stationary unit downlink information to said at least one repeater on said best downlink time slot selected by said at least one repeater; and repeating by said at least one repeater said downlink information transmitted by said at least one stationary unit to said at least one portable unit, thereby establishing said downlink communication, wherein $n+1 \leq N$, and $n \geq 1+N/2$.

9. The method according to claim 8, wherein the step of repeating said downlink information repeats said downlink information on a free downlink time slot which was most recently occupied by a previous downlink communication.

10. The method according to claim 8, wherein the step of repeating said downlink information further comprises the step of:

adding data corresponding to an identity of said at least one repeater to said downlink information.

11. The method according to claim 8, wherein said access demand information transmitted by said at least one portable unit includes data corresponding to an identity of a desired said at least one stationary unit.

12. The method according to claim 8, wherein said at least one portable unit detects that said at least one repeater and said at least one stationary unit have different identities.

* * * * *